United States Patent Office 2,886,649
Patented May 12, 1959

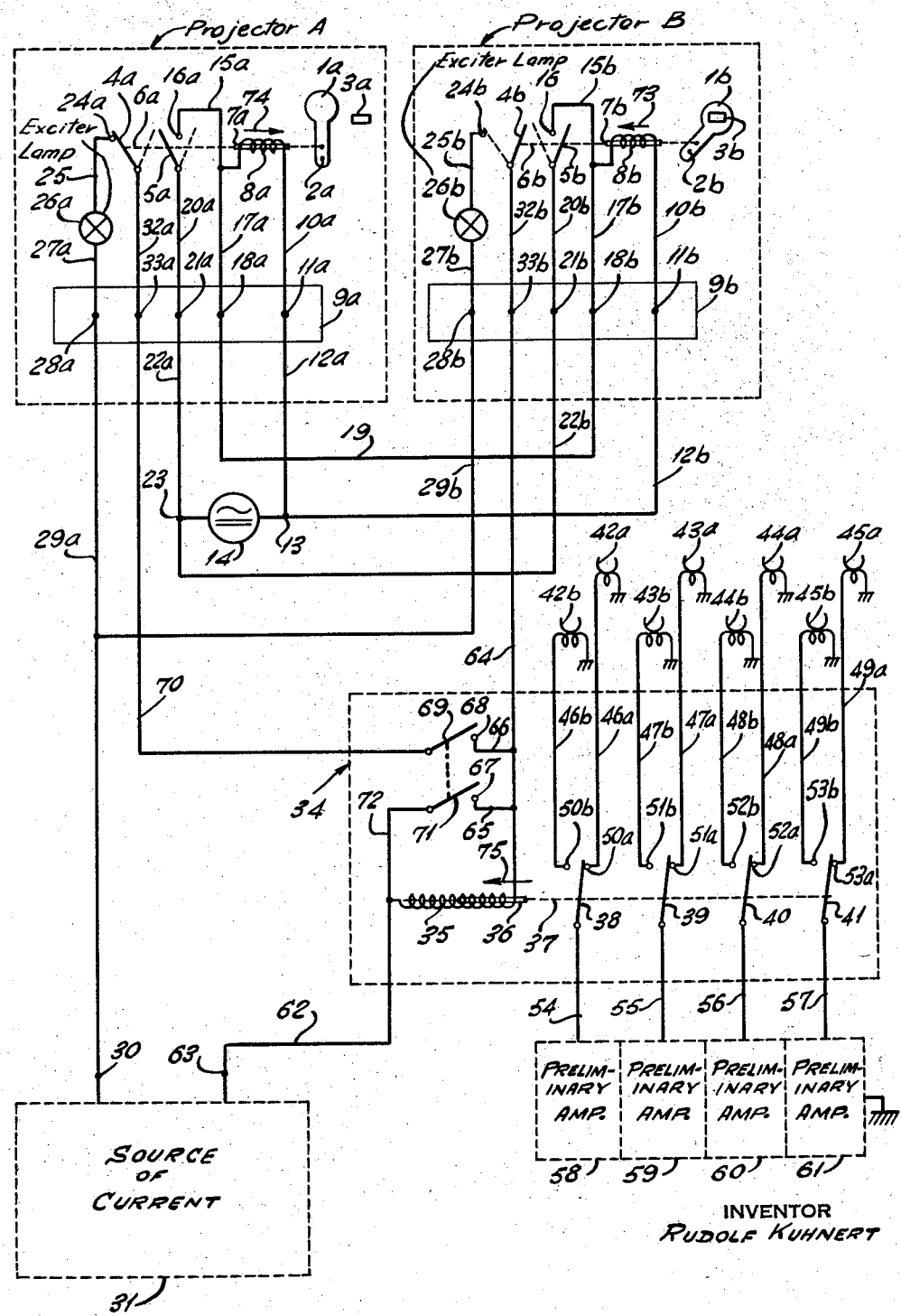

2,886,649

MOTION PICTURE PROJECTOR CHANGING-OVER SYSTEM FOR MAGNETIC AND OPTICAL SCANNING

Rudolf Kuhnert, Dresden, Germany, assignor to VEB Zeiss Ikon Dresden, Dresden, Germany Application December 6, 1956, Serial No. 626,668

16 Claims. (Cl. 179—100.1)

This invention relates to a change-over device, and more particularly to change-over devices for use with a plurality of motion picture projectors so as to reproduce a continuous program from a plurality of successive film records without interruption of the picture and without audible interruption through the different sound tracks.

An object of the invention is to provide a change-over device for use with a plurality of motion picture projections, which may be used selectively either for the projection of films having an optical sound track or films having a magnetic sound track.

Another object of the invention is to provide a change-over device, by means of which existing change-over systems for use with motion picture projectors for projecting films having an optical sound track may be readily adapted for use with motion picture projectors for projecting films having a magnetic sound track without necessitating any change on the projectors themselves.

Other objects and advantages of the present invention will be apparent from the following detailed description thereof in connection with the accompanying drawing, showing by way of example an embodiment of the present invention.

In the drawing, the sole figure is a wiring diagram of a change-over device according to the invention, said figure illustrating only these parts pertaining to the change-over device and necessary to the understanding of the invention.

Referring now to the drawing, A generally indicates a first motion picture projector and B generally indicates a second motion picture projector which are to be operated in succession without interruption of the reproduction of the picture and of the sound.

The changing-over of the picture is performed by the shutters 1a of the projector A and 1b of the projector B, said shutters 1a and 1b being swingable around the pivots 2a and 2b respectively for covering or uncovering the openings or windows 3a and 3b respectively to the passage of light. The switches 4a and 5a are mechanically coupled with the shutter 1a of the projector A by means of a rod 6a. In a similar manner switches 4b and 5b are mechanically coupled with the shutter 1b of the projector B by means of a rod 6b. A solenoid 7a and 7b respectively is rigid with the rod 6a and 6b respectively. The solenoids 7a and 7b respectively are subject to the action of magnet coils 8a and 8b respectively. Terminal boards 9a and 9b respectively are arranged at readily accessible portions of the projectors A and B respectively. The electrical elements of the change-over devices built into the projectors A and B respectively are connected with said terminal boards 9a and 9b respectively.

One end of the winding of the magnet coil 8a is connected through the line 10a with the terminal 11a of the terminal board 9a of the projector A. Likewise one end of the winding of the magnet coil 8b is connected through the line 10b with the terminal 11b of the terminal board 9b of the projector B. Lines 12a and 12b respectively lead from said terminals 11a and 11b respectively to the pole 13 of a source 14 of direct or alternating current. Said source 14 of current is used for exciting the magnet coils 8a and 8b respectively. The other ends of the windings of the magnet coils 8a and 8b respectively are connected through lines 15a and 15b respectively with stationary contacts 16a and 16b respectively arranged for cooperation with the movable contact elements of the switches 5a and 5b respectively. Lines 17a and 17b respectively branched-off from the lines 15a and 15b respectively are connected with the terminals 18a and 18b respectively of the terminal boards 9a and 9b respectively. The terminal 18a is connected with the terminal 18b by a line 19. The movable contact elements of the switches 5a and 5b respectively are connected with terminals 21a and 21b respectively of the terminal boards 9a and 9b respectively by means of lines 20a and 20b respectively. Said terminals 21a and 21b respectively are connected with the other pole 23 of the source 14 of direct or alternating current by lines 22a and 22b respectively.

A stationary contact 24a arranged for cooperation with the movable element of the switch 4a is connected with an exciter lamp 26a through a line 25a. Said exciter lamp 26a is connected with the terminal 28a of the terminal board 9a by means of a line 27a. In a similar manner the stationary contact 24b of the switch 4b is connected by a line 25b with an exciter lamp 26b, which is connected with the terminal 28b of the terminal board 9b by a line 27b. The terminals 28a and 28b are connected by means of lines 29a and 29b with one pole 30 of a source 31 of current for the exciter lamps 26a and 26b respectively. The movable contact elements of the switches 4a and 4b respectively are connected by lines 32a and 32b respectively with the terminals 33a and 33b respectively of the terminal boards 9a and 9b.

All of above mentioned parts and electrical connections pertain to the change-over system for changing-over the picture and the optical sound. Hereinafter I describe the parts and electrical connections arranged for an additional magnetic sound scanning device and an additional change-over system for magnetic sound, which may be selectively used.

A unit generally indicated by 34 contains a magnet coil 35, the magnetic field of which acts on a solenoid 36 rigidly connected with a rod 37 coupling with each other a plurality of changing-over switches 38, 39, 40, 41 likewise arranged within said unit 34. A plurality of magnetic scanning heads 42a, 43a, 44a, 45a and 42b, 43b, 44b, 45b respectively, four heads for each projector A and B respectively, are associated in a suitable manner (not shown) with the sound devices of the projectors for the scanning of four magnetic sound tracks or channels on a film to be reproduced. The before mentioned changing-over switches 38, 39, 40, 41 being coupled with each other by the rod 37 are arranged for controlling the changing-over of the magnetic scanning heads 42a, 43a, 44a, 45a and 42b, 43b, 44b, 45b respectively. As may be readily gathered from the drawing, one end of the winding of each magnet head coil is grounded, while the other end of each of the various windings is connected by a line 46a, 47a, 48a, 49a or 46b, 47b, 48b, 49b respectively with a stationary contact 50a 51a, 52a, 53a or 50b, 51b, 52b, 53b respectively, the stationary contacts 50a and 50b cooperating with the movable contact element of the switch 38, the stationary contacts 51a and 51b cooperating with the movable contact element of the switch 39, the stationary contacts 52a and 52b cooperating with the movable contact element of the switch 40, and the stationary contacts 53a and 53b cooperating with the movable contact element of the switch 41. The movable contact elements of the switches 38, 39, 40, and 41 respectively are connected by lines 54, 55, 56, 57 respectively with the preliminary amplifiers 58, 59, 60, 61 respectively for the individual sound channels.

One end of the winding of the magnet coil 35 is connected by a line 62 with the other pole 63 of the source 31 of current for the exciter lamps 26a and 26b respectively. The other end of said winding of said magnet coil 35 is connected by a line 64 with the terminal 33b of the terminal board 9b of the projector B. Lines 65 and 66 branching-off from said line 64 connect said other end of said winding of the magnet-coil 35 also with stationary contacts 67 and 68 respectively of selector switches 71 and 69 respectively, the movable contact elements of which are mechanically connected with each other. The movable contact element of the switch 71 is connected by a line 72 with the first mentioned end of the winding of the magnet coil 35. The movable contact elements of the switch 69 is connected by a line 70 with the terminal 33a of the terminal board 9a of the projector A.

The operation of the change-over device according to the invention during a change-over from projector A to projector B is as follows:

(a) *Change-over from projector A to projector B during the scanning of optical sound tracks*

In order to use the system for the scanning of optical sound tracks, the selector switches 69 and 71, coupled with each other, are brought from the open position shown in the drawing into a closed position wherein their movable contact elements are in contact with the stationary contacts 68 and 67 respectively. Thus, the magnet coil 35 is short circuited by the switch 71 and the current supply circuit for the exciter lamp 26a is closed by both selector switches 71 and 69 arranged in series. As long as projector A is in operation, the shutter 1a is in the position shown in the drawing wherein the window 3a for projecting the picture is open. The movable contact element of the switch 4a is in contact with the stationary contact 24a, so that the current supply circuit for the exciter lamp 26a is closed. The projector B is not in operation and its window 3b for projecting the picture is closed by the shutter 1b. The switch 4b is in open position (as shown in the drawing) so that the current supply circuit for the exciter lamp 26b of the projector B is interrupted at that point. Now, when the change-over from projector A to projector B shall take place, upon a preceding start of the driving motor (not shown) of the projector B and switching-on of the light source (not shown) of said projector B, the light shutter 1b of said projector B is manually swung around its pivot 2b so that it uncovers the window 3b for the passage of light rays. Simultaneously herewith the rod 6b is displaced in the direction of the arrow 73, whereby the switches 4b and 5b are actuated for movement into the position shown in dash lines. During such a movement of the rod 6b in the direction of the arrow 73, the movable element of the switch 5b contacts briefly the stationary contact 16b (wiper contact), while at the end of said movement of the rod 6b the switch 5b is again in open position and the movable contact element of the switch 4b contacts the stationary contact 24b for bringing same into its closing position. Such a contact of the movable contact element of the switch 4b with the stationary contact element 24b causes a closing of the current supply circuit of the exciter lamp 26b. The before mentioned brief contacting engagement of the movable contact element of the switch 5b with the wiper contact 16b causes a temporary closing of the circuit of the magnet coils 8b and 8a. The magnetic field thus caused by the rush of current in the magnet coil 8b has no effect on the solenoid 7b, as the force thereof is overcome by the manual displacement of the rod 6b or the manual swinging of the light shutter 1b respectively. The magnetic field generated in the magnet coil 8a, however, acts in such a manner on the solenoid 7a rigidly connected with the rod 6a, that the said rod 6a is pulled in the direction of the arrow 74, whereby on one hand the light shutter 1a closes the light window 3a and on the other hand the switch 4a is brought into its open position (shown in dash lines) for interrupting the circuit of the exciter lamp 26a. Thus, the changing-over operation is completed and the driving motor as well as the light emitting lamp of the projector A may be switched-off.

(b) *Change-over from projector A to projector B during the scanning of magnetic sound tracks*

In order to use the system for the scanning of magnetic sound tracks the selector switches 69 and 71 must be in the open position as shown in the drawing.

Again it is assumed that projector A is in operation and, accordingly, its light shutter 1a is in the position shown in the drawing so as to permit passage of light through the window 3a. The circuit of the exciter lamp 26a is interrupted by the switches 69 and 71 being in the open position shown in the drawing. Furthermore, there is no supply of current to the magnet coil 35 as the switch 4b is in open position as shown in full lines in the drawing. The changing-over switches 38, 39, 40 and 41 are in such a position (as shown in the drawing), that the magnet heads 42a, 43a, 44a and 45a associated with the projector A are connected with the preliminary amplifiers 58, 59, 60 and 61 respectively through the contacts 50a, 51a, 52a, 53a respectively. Now, when a change-over from the projector A to the projector B is performed, the projector window 3b is uncovered by a manual swinging of the light shutter 1b in the same manner as described above under (a). Furthermore, again a rush of current is supplied to the magnet coil 3a during the movement of the switch 5b when the movable contact element of the latter briefly contacts the wiper contact 16b, whereby the light shutter 1a of the projector A is swung into a position closing the window 3a of the projector A in the manner described above under (a). Moreover, at the end of the swinging movement of the light shutter 1b of the projector B the switch 4b coupled with said light shutter 1b through the rod 6b is moved into the closing position (shown in dash lines), whereby the circuit of the exciter lamp 26b is closed. The magnitude of the electrical resistance of the magnet coil 35, however, is so, that only a comparatively small current may flow through the exciter lamp 26b which renders impossible an exciting of said exciter lamp. Said comparatively small current, however, suffices for creating a magnetic field in the magnet coil 35, by means of which the solenoid 36, together with the rod 37, is drawn in the direction of the arrow 75 causing a changing-over of the changing-over switches 38, 39, 40 and 41, so that, now, the magnet heads 42b, 43b, 44b and 45b of the projector B are connected with the preliminary amplifiers 58, 59, 60 and 61 respectively through the contacts 50b, 51b, 52b and 53b respectively.

It will be readily understood from the foregoing that the change-over systems being present in existing projectors (A and B) for the changing-over of picture and light sound may also be utilized for an additional magnetic sound scanning device without requiring changes in the construction of the projectors. There are merely minor changes necessary in the electrical connections outside the projectors leading to the terminal boards 9a and 9b of the latter. The two terminals 33a and 33b are no longer directly connected with the pole 63 of the device 31 for supplying current, but there is a connection through the lines 70 and 64 respectively between each of said terminals 33a and 33b and the unit 34 and there is a connection through the line 62 between the pole 63 of the current supplying device 31 and said unit 34.

The unit 34 may be arranged next to the preliminary amplifiers 58, 59, 60 and 61 or next to the device 31 for supplying current to the exciter lamps 26a and 26b. Furthermore, if desired, the unit 34 may be arranged within the device 31 for supplying current to the exciter lamps or within the preliminary amplifiers 58, 59, 60 and 61. If the preliminary amplifiers 58, 59, 60, 61 and the device 31 for supplying current to the exciter lamps form a constructional unit, the unit 34 may be arranged within such a constructional unit.

As for the scanning of optical sound and magnetic sound, separate preliminary amplifiers and, under certain conditions, separate intermediate amplifiers are also necessary. According to the invention, additional switches for the changing-over of the separate preliminary amplifiers and intermediate amplifiers respectively may be coupled with the combination of selector switches 69 and 71. Thus, the arrangement of a separate selector device for the preliminary amplifiers and intermediate amplifiers respectively to be operated separately for the selecting of optical sound scanning or magnet sound scanning respectively is eliminated.

While I have described a preferred embodiment of my invention, it is obvious that numerous additions, changes and omissions may be made in said embodiment without departing from the scope of the invention as defined in the appended claims.

For example, instead of the electro-magnetic relay arrangement shown in the drawing an electronic relay control could be used, if so desired.

I claim:

1. A change-over device for use with at least two motion picture sound projectors each having a selective optical scanning sound system and a magnetic scanning sound system, said device comprising relay means for controlling the change-over of the magnetic sound systems from one projector to another, and a selector switch for short circuiting the relay means and energizing the optical scanning sound systems when the projectors are operated for optical sound projection.

2. A change-over device according to claim 1 in which the relay means includes a relay of the electro-mechanical type.

3. A change-over device according to claim 1 in which the relay means includes a relay of the electronic type.

4. A change-over device according to claim 1 which includes an energizing circuit for the optical scanning system of one of said projectors, the said selector switch positioned to interrupt said energizing circuit during a change-over to magnetic sound scanning.

5. A change-over device according to claim 1 in which the optical scanning systems of each projector includes a respective exciter lamp, the relay means having an electrical resistance of sufficient magnitude to operatively de-energize said exciter lamps.

6. A change-over device according to claim 1 in which each magnetic scanning sound system of each projector includes a plurality of magnetic pick-up heads for film with multiple sound tracks, each pick-up head having a selector switch, said relay means being coupled to said pick-up head selector switches for simultaneous change-over of the pick-up heads of each projector upon actuation of said relay means.

7. A change-over system according to claim 6 in which the first and second selector switches, the relay means, and the magnetic pick-up head change-over switches are arranged in an integral constructional unit, the optical scanning systems having means for supplying electrical current thereto, the change-over device including pre-amplifier means for said magnetic scanning systems, the constructional unit being located proximate to both the current supplying means and pre-amplifier means.

8. A change-over device according to claim 1 in which the optical scanning systems and the magnetic scanning systems have individual amplifier means, each amplifier means having a control switch, the selector switch being coupled to said control switches for simultaneous operation therewith.

9. A change-over device for use with at least a pair of motion picture sound projectors, said device comprising, in combination, an optical sound scanning system and a magnetic sound scanning system associated with each of said projectors, change-over means for simultaneously and alternately activating one projector and its optical scanning system and deactivating another projector and its optical scanning system, selector means for deactivating the optical sound scanning systems of said projectors and activating the magnetic sound scanning systems, and relay means responsive to said selector means for connecting said magnetic sound scanning system to said change-over means when said optical scanning system is deactivated.

10. For use with a pair of motion picture projectors each having an optical scanning sound system and selector switch means for alternately energizing one optical scanning sound system and de-energizing the other, an alternate magnetic scanning sound system for each projector, said alternate system comprising a magnetic sound scanning device for each projector, a relay for switching from one magnetic sound scanning device to another, and circuit means connecting said relay in series with one of said optical scanning sound systems, the circuit means including a by-pass switch in series with said optical scanning sound system and in parallel with said relay, the relay being responsive to movement of the selector switch means of the optical scanning system when the bi-pass switch is in operative position.

11. For use with a pair of motion picture projectors each having an optical scanning sound system including an exciter lamp, and change-over switch means for alternately energizing the lamp of one projector and simultaneously de-energizing the lamp of the other projector, an alternate magnetic scanning sound system for each projector, said alternate system comprising a magnetic sound scanning device for each projector, a relay for change-over from one magnetic scanning device to another, and circuit means connecting said relay in series with the exciter lamp of one projector through the respective change-over switch, the circuit means including a by-pass switch in series with said exciter lamp and in parallel with said relay, said by-pass switch having an open position in which said relay is connected in series with the exciter lamp and a closed position in which the relay is by-passed, the relay being responsive to movement of the change-over switch in series therewith.

12. For use with a pair of motion picture sound projectors, a change-over system comprising, in combination, an optical scanning sound device and a magnetic scanning sound device for each projector, selection means for selecting one of the sound devices for operation in both projectors, and change-over means for actuating the selected sound device in one projector and simultaneously deactivating the selected sound device in the other projector, said change-over means including an energizing circuit for said optical scanning devices, change-over switch means in said energizing circuit for alternately energizing said optical scanning devices, a relay in said energizing circuit in series with said change-over switch means, said relay controlling the change-over of said magnetic scanning devices, said selection means including a selector switch for short-circuiting the relay for optical scanning of said projectors and for de-energizing the optical scanning devices and operatively connecting said relay to said change-over switch means for magnetic scanning of said projectors.

13. A change-over system according to claim 12 in which the relay is in series with one of said optical scanning devices in said energizing circuit, said relay having sufficient electrical resistance to operatively de-energize said optical scanning device, said selector switch being operative to by-pass the relay in the energization circuit for energization of the optical scanning devices.

14. A change-over system according to claim 13 in which each optical scanning device comprises an exciter lamp and a change-over switch in series therewith, said relay being in series with one of said exciter lamps through its respective change-over switch.

15. A change-over system according to claim 14 in which each magnetic scanning device comprises a plurality of pick-up heads each having a change-over switch, the respective change-over switches of each magnetic scanning device being coupled for simultaneous operation to said relay.

16. A change-over system for use with a pair of motion picture sound projectors, said change-over system comprising, in combination, an optical scanning sound system including an exciter lamp associated with each of said projectors, change-over switch means connected in series with each of said exciter lamps, means for selectively deactivating one of said projectors while opening its change-over switch means and simultaneously activating the other projector while closing its change-over switch means, at least one magnetic pick-up head associated with each of said projectors, an amplifier, a relay for selectively connecting the magnetic pick up heads to said amplifier, said relay including a solenoid circuit means connecting a first terminal of said solenoid to one of said change-over switches and a second terminal thereof to a first terminal of a current source, the second terminal of said current source being connected to said exciter lamps, a first selector switch connected between said solenoid terminals, and a second selector switch connected between said solenoid first terminal and said other change-over switch.

References Cited in the file of this patent
UNITED STATES PATENTS

| | | |
|---|---|---|
| 1,990,388 | Lootens | Feb. 5, 1935 |
| 2,002,351 | Owens | May 21, 1935 |
| 2,036,306 | Soons | Apr. 7, 1936 |
| 2,054,268 | Owens | Sept. 15, 1936 |
| 2,081,015 | Mullen et al. | May 18, 1937 |
| 2,088,574 | Brown | Aug. 3, 1937 |
| 2,106,957 | Nielsen | Feb. 1, 1938 |
| 2,676,272 | Byrd et al. | Apr. 20, 1954 |